United States Patent
Owan

(10) Patent No.: US 10,728,791 B2
(45) Date of Patent: Jul. 28, 2020

(54) WIRELESS INTERFACE VIRTUALIZATION

(71) Applicant: General Electric Company, Schenectady, NY (US)

(72) Inventor: Alan John Owan, Shorewood, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 427 days.

(21) Appl. No.: 14/525,073

(22) Filed: Oct. 27, 2014

(65) Prior Publication Data
US 2016/0119812 A1    Apr. 28, 2016

(51) Int. Cl.
*H04W 28/02* (2009.01)
*H04W 84/12* (2009.01)
*H04W 24/04* (2009.01)

(52) U.S. Cl.
CPC ... *H04W 28/0236* (2013.01); *H04W 28/0226* (2013.01); *H04W 28/0268* (2013.01); *H04W 24/04* (2013.01); *H04W 84/12* (2013.01)

(58) Field of Classification Search
None
See application file for complete search history.

(56) References Cited

U.S. PATENT DOCUMENTS

| 6,317,854 | B1 * | 11/2001 | Watanabe | H04L 1/1809 714/749 |
| 2007/0207822 | A1 * | 9/2007 | Andersson | H04W 36/12 455/502 |
| 2008/0123553 | A1 * | 5/2008 | Boyina | H04W 24/04 370/254 |
| 2008/0193131 | A1 * | 8/2008 | DeCusatis | G06F 13/387 398/75 |
| 2009/0088169 | A1 * | 4/2009 | Aaron | H04W 76/15 455/445 |
| 2009/0185513 | A1 * | 7/2009 | Fleischman | H04L 1/0083 370/310 |
| 2011/0286387 | A1 * | 11/2011 | Sane | H04L 1/1685 370/328 |

(Continued)

OTHER PUBLICATIONS

Coskun, H. et al., "Virtual WLAN: Going Beyond Virtual Access Points," Scientific Conference on Communication in Distributed Systems, Electronic Communications of the EASST, vol. 17, Mar. 2-6, 2009, 13 pages.

(Continued)

*Primary Examiner* — Jeffrey M Rutkowski
*Assistant Examiner* — Mehedi S Aley
(74) *Attorney, Agent, or Firm* — McCoy Russell LLP

(57) ABSTRACT

Examples of selectively transmitting redundant data over a wireless network are provided. One example includes initializing a first wireless virtual interface and a second wireless virtual interface, each wireless virtual interface communicating with a network using resources of the wireless hardware device and transmitting data from the first wireless virtual interface to the network via a first channel to a first access point of the network. The example further includes transmitting a selected amount of redundant data from the second wireless virtual interface to the network via a second channel to a second access point of the network, the selected amount being based on channel metrics of one or more of the first channel and the second channel.

19 Claims, 7 Drawing Sheets

(56) References Cited

U.S. PATENT DOCUMENTS

| | | | | |
|---|---|---|---|---|
| 2011/0292882 A1* | 12/2011 | Hobza | ............... | H04W 48/12 |
| | | | | 370/328 |
| 2012/0064908 A1* | 3/2012 | Fox | ............... | H04W 28/10 |
| | | | | 455/452.2 |
| 2013/0293373 A1* | 11/2013 | Gegner | ............... | A61B 5/0002 |
| | | | | 340/527 |
| 2014/0064199 A1* | 3/2014 | Pan | ............... | H04L 1/1867 |
| | | | | 370/329 |
| 2014/0119303 A1* | 5/2014 | Kwon | ............... | H04W 74/0808 |
| | | | | 370/329 |
| 2014/0201383 A1* | 7/2014 | Kuehnel | ............... | H04W 76/025 |
| | | | | 709/231 |
| 2014/0219194 A1* | 8/2014 | Varoglu | ............... | H04W 36/14 |
| | | | | 370/329 |
| 2015/0103663 A1* | 4/2015 | Amini | ............... | H04W 28/0215 |
| | | | | 370/235 |
| 2015/0350598 A1* | 12/2015 | Yang | ............... | H04W 24/08 |
| | | | | 348/14.02 |
| 2016/0081076 A1* | 3/2016 | Zhang | ............... | H04B 7/026 |
| | | | | 370/336 |

OTHER PUBLICATIONS

Ahn, S. et al., "Network Interface Virtualization in Wireless Communication for Multi-Streaming Service," IEEE 15th Annual Symposium on Consumer Electronics, pp. 67-70, Jun. 14-17, 2011, 4 pages.

Aljabari, G. et al., "Virtual WLAN: Extension of Wireless Networking into Virtualized Environments," International Journal of Computing, vol. 10, No. 4, pp. 330-336, Dec. 2011, 9 pages.

\* cited by examiner

WIRELESS INTERFACE VIRTUALIZATION

FIELD

Embodiments of the subject matter disclosed herein relate to wireless communication and associated interfaces, for example.

BACKGROUND

Medical devices, such as patient monitoring equipment, may utilize wireless communication to transmit data from the monitoring equipment and associated sensors to one or more other computing devices for further processing and/or presentation. The amount of patient monitoring data may be small in size relative to a data bandwidth capacity of a wireless communication channel with good signal conditions. However, a wireless link may have a varying level of quality and on occasion have degradation leading to data loss. In order to maintain acceptable levels of data integrity, lost data may be retransmitted, but with delay incurred while resending the data, especially if the low link quality persists, causing sequential failures. As patient monitoring data may be utilized for real-time analysis of a patient's status, an increase in data transfer time may compromise such endeavors.

BRIEF DESCRIPTION

In one embodiment, a method of transmitting data with a wireless hardware device, comprises initializing a first wireless virtual interface and a second wireless virtual interface, each wireless virtual interface communicating with a network using resources of the wireless hardware device and transmitting data from the first wireless virtual interface to the network via a first channel to a first access point of the network. In the embodiment, the method further comprises transmitting a selected amount of redundant data from the second wireless virtual interface to the network via a second channel to a second access point of the network, the selected amount being based on channel metrics of one or more of the first channel and the second channel.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of utilizing virtual interfaces for wireless communication. When communicating data in a medical environment (e.g., in a patient monitoring system), a transfer of data may fail due to factors affecting a wireless link (e.g., patient movement, varying signal path losses, noise interference, etc.). Re-sending lost data or repeating data redundantly on a single wireless communication link may be successful after temporary degradation short in duration, but would not be an effective use of resources in more prolonged circumstances when subsequent retransmission attempts fail as well. The delay until a longer degradation subsides and repeat packets finally arrive may be detrimental to time-sensitive healthcare applications.

In order to mitigate the conflicting concerns of reliability and latency, the present disclosure provides systems and methods for selectively transmitting redundant data to a network via two different communication channels, thereby providing an alternate possibility for successful transmissions. However, the addressing scheme of IEEE 802.11 specification (e.g., WI-FI) restricts a given wireless hardware device (e.g., a wireless network interface/interface controller) to associate (maintain a connection) to only one access point/channel at a time, and to only start sending payload data to a new access point after exchanging protocol management frames. Multiple wireless hardware devices may be utilized to enable the transmission of redundant data on separate paths to the network when each device communicates separately in accordance with IEEE 802.11, but such an approach also increases the cost, physical size/weight, and complexity of the system. The present disclosure addresses these issues by providing a wireless virtual interface (VIF) in order to allow a single physical network device's resources to connect to an 802.11 network with simultaneous association via different access points. The virtualized interface may also enable reliable handover routines to be performed during roaming (e.g., when the device enters the communication range of new access points that may provide more robust connections to the network) by sending redundant data to a first currently-used access point while transitioning from a second currently-used access point to a new access point.

Figure 1:
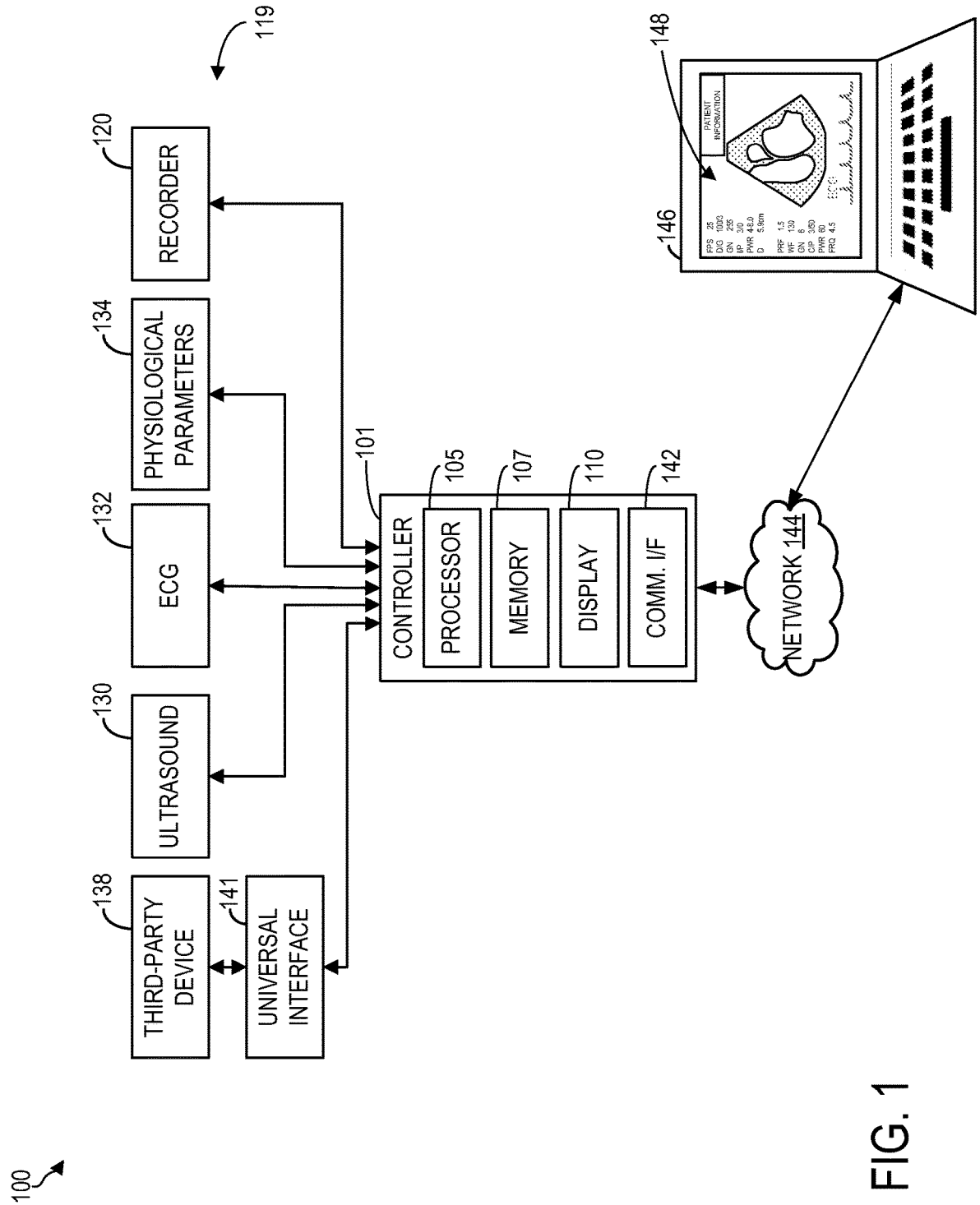
FIG. 1 shows a schematic diagram of an example patient monitoring system.
Figure 2:
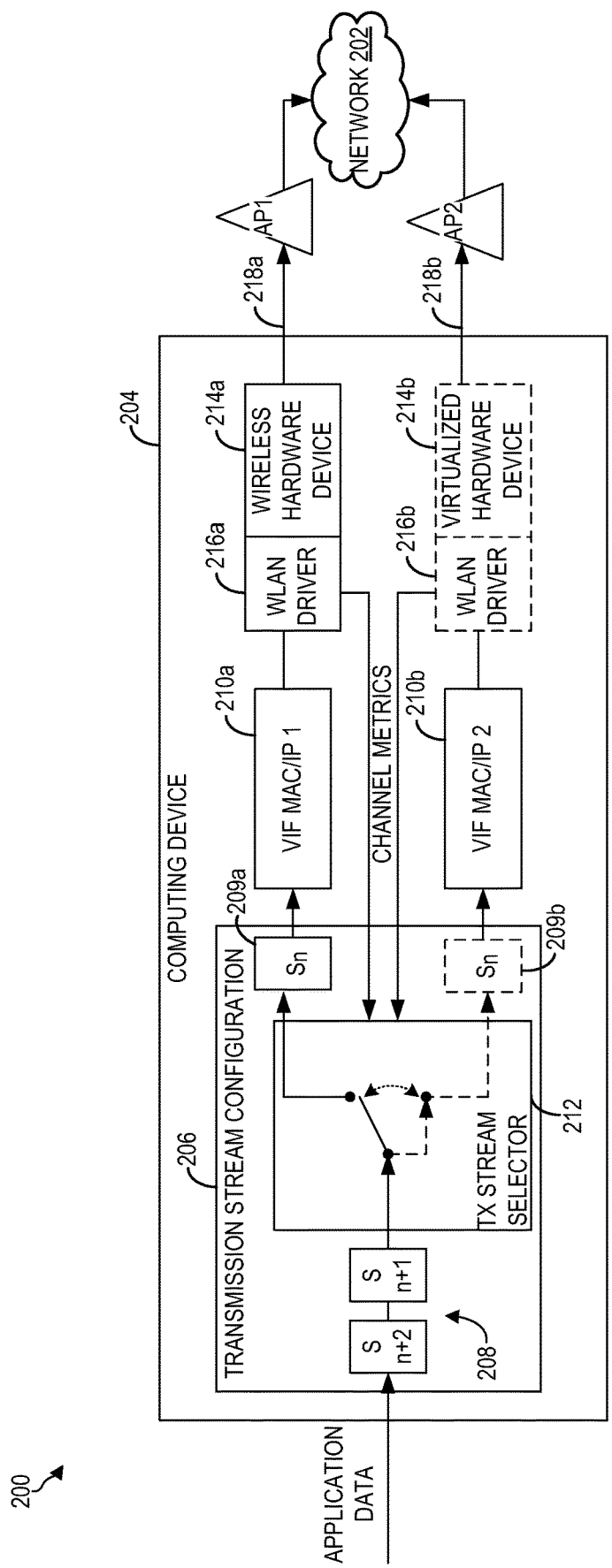
FIG. 2 shows a schematic diagram of an example communication system for transmitting data via wireless virtual interfaces.
Figure 3:
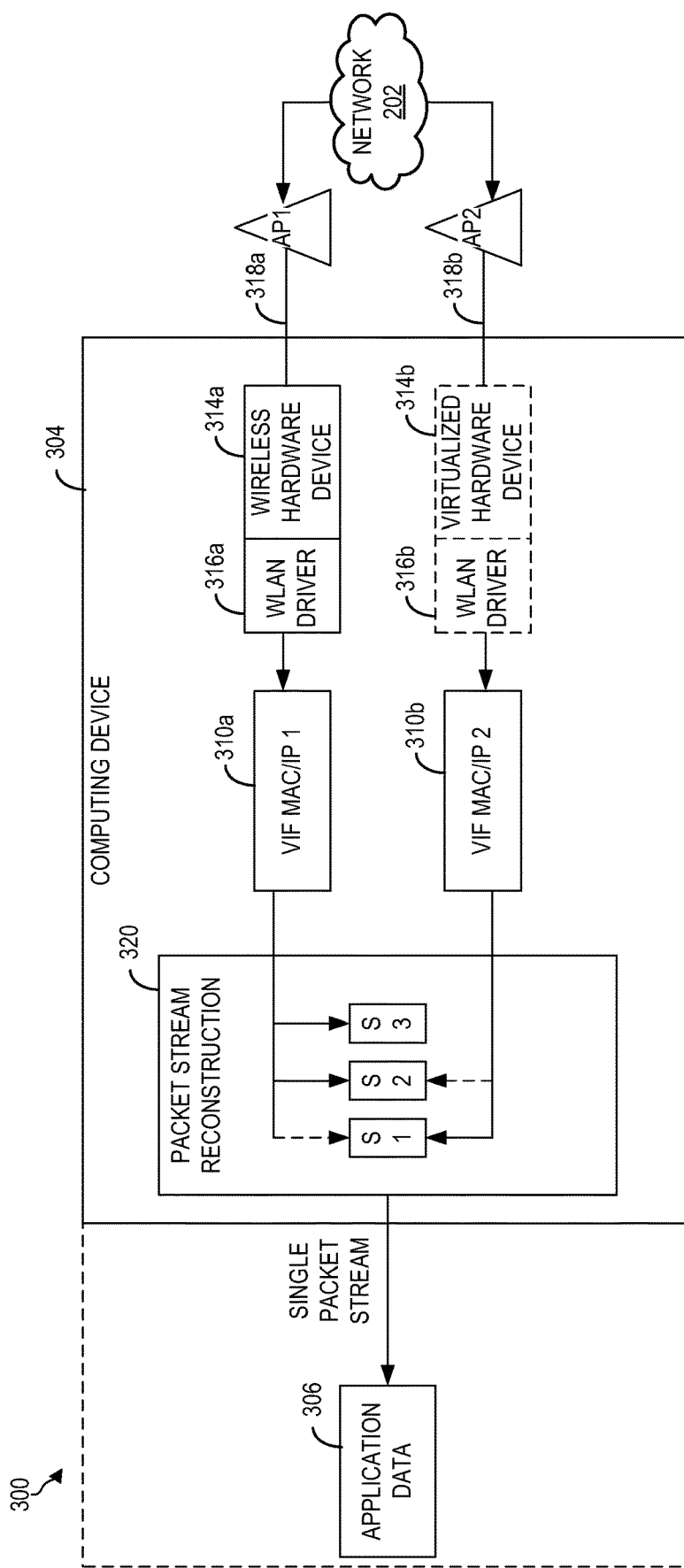
FIG. 3 shows a schematic diagram of an example communication system for receiving data via wireless virtual interfaces.
Figure 4:
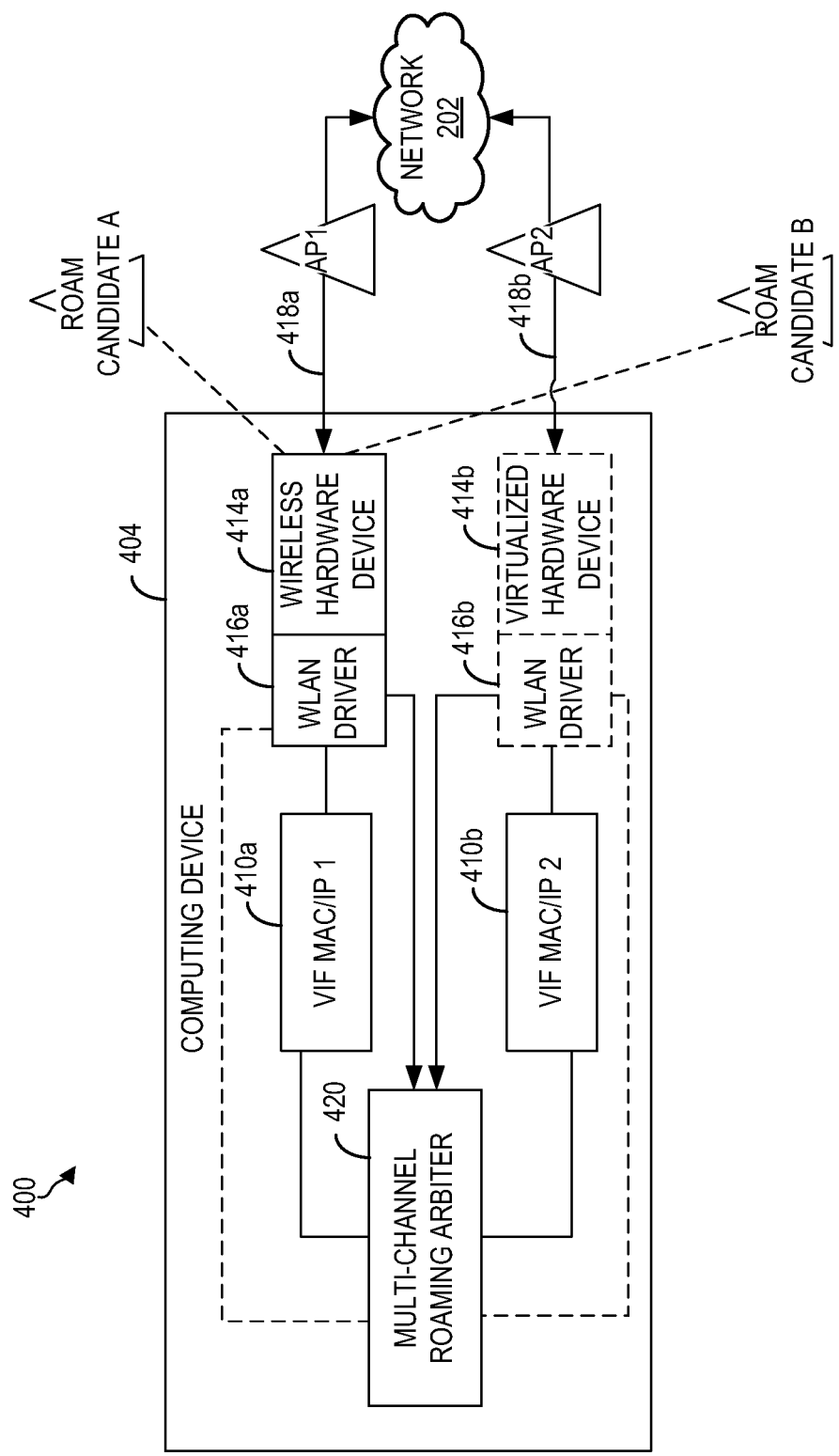
FIG. 4 shows a schematic diagram of an example communication system for roaming between access points of a network.
Figure 5:
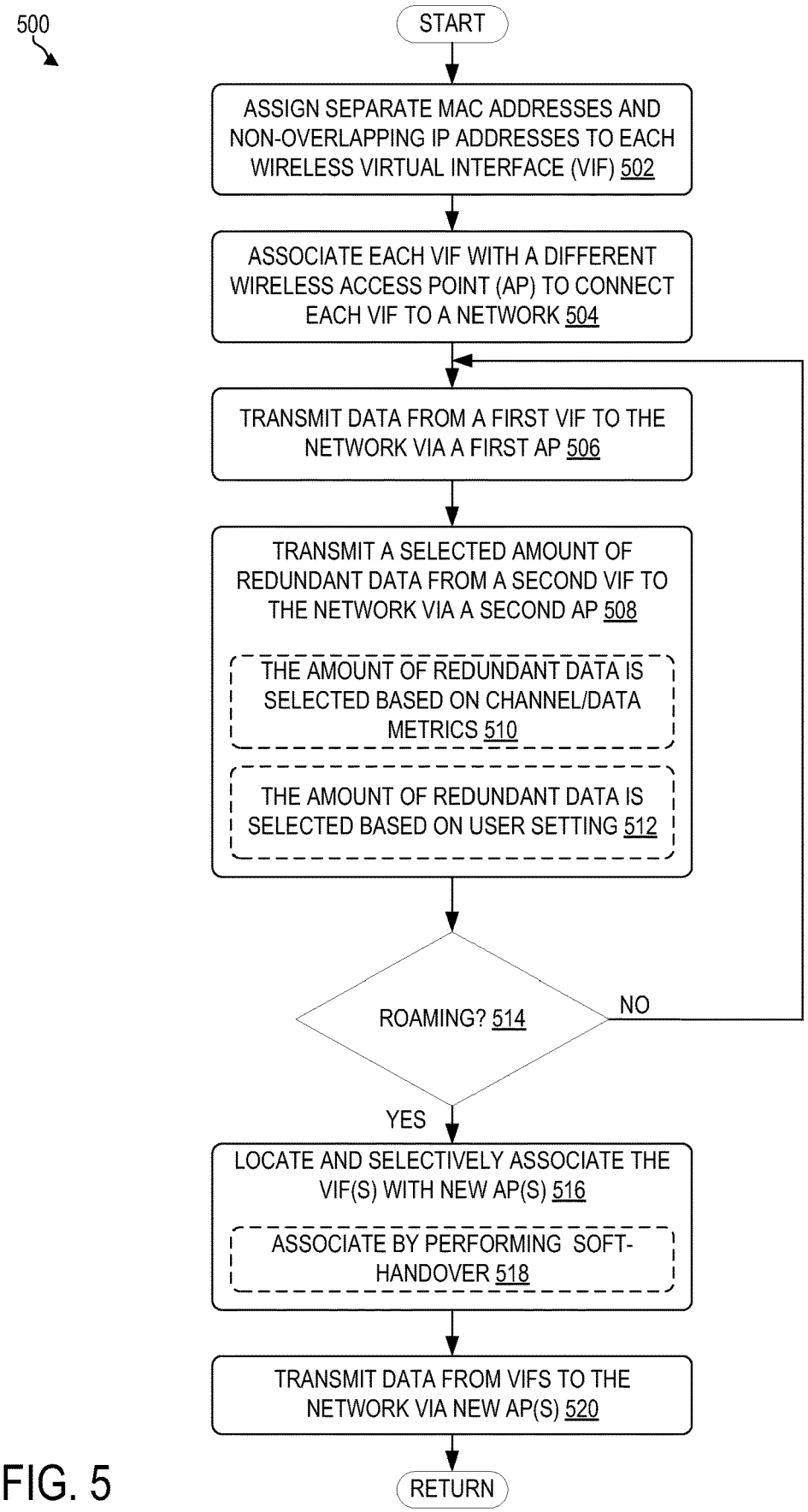
FIG. 5 is a flow chart of an example method for selectively transmitting redundant data via wireless virtual interfaces.
Figure 6:
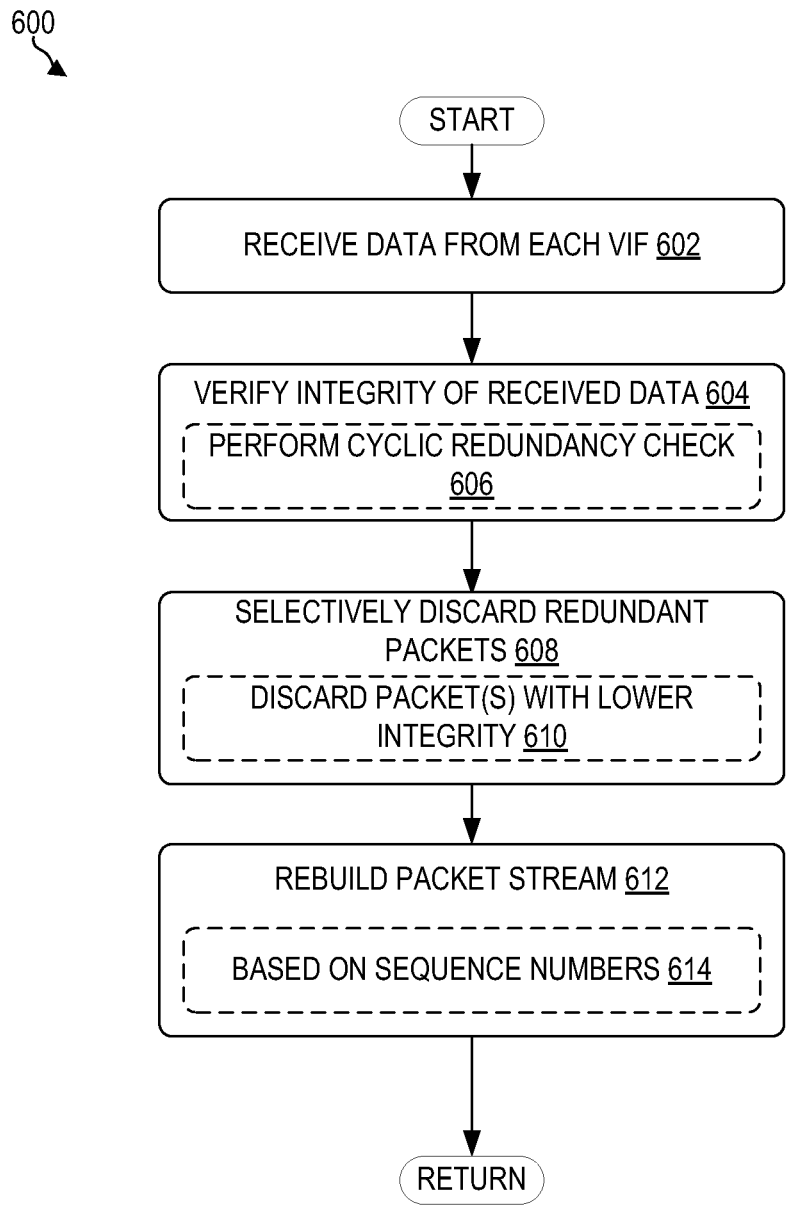
FIG. 6 is a flow chart of an example method for receiving data via wireless virtual interfaces.
Figure 7:
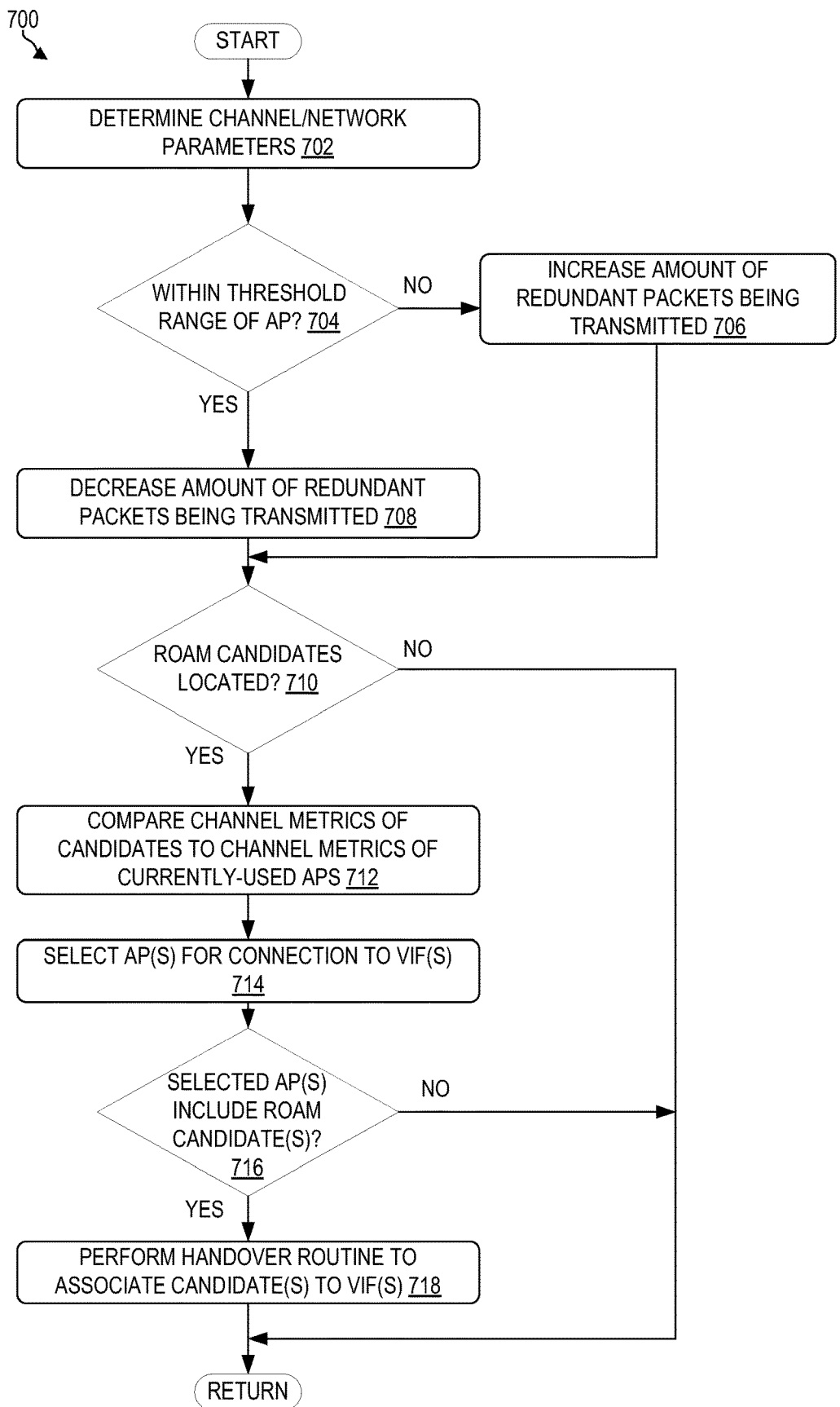
FIG. 7 is a flow chart of an example method for evaluating network parameters, adjusting redundant data transmission, and roaming between access points of a network.

According to embodiments disclosed herein, data (e.g., medical data, such as patient monitoring data) may be sent from a first device (e.g., a device that is proximate to the patient being monitored) to a second device (e.g., a computing device for presenting, analyzing, and/or monitoring the patient monitoring data). As the second device may be remotely located from the first device (e.g., to enable a clinician to monitor a patient remotely), the data may be communicated via an 802.11 network. Although the devices described herein include elements of patient monitoring systems, it is to be understood that the methods and systems may be performed by and/or include any suitable devices for communicating via an 802.11 network. FIG. 1 shows a patient monitoring system that may be used to acquire and transmit data for monitoring a status of a patient. The ultrasound system of FIG. 1 also includes a computing system including instructions to carry out one or more communication methods to provide low-latency, reliable data between devices. FIGS. 2-4 are schematic diagrams of communication systems that may include one or more elements of the patient monitoring system of FIG. 1. FIGS. 5-7 are flow charts illustrating communication methods that may be carried out by one or more of the computing system(s) of the patient monitoring system of FIG. 1.

FIG. 1 is a schematic diagram of a patient monitoring system 100 in accordance with an embodiment of the invention. The patient monitoring system 100 includes a computing device, herein referred to as a display controller 101, that aggregates video, audio, electrical, and other data from multiple, dissimilar source systems 119. The controller 101 may treat data from source systems 119 as individual information elements, which can be communicated and aggregated independently from one another.

Controller 101 may include a logic machine, such as processor 105. Processor 105 may include one or more physical devices configured to execute instructions. For example, processor 105 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The processor 105 is in electronic communication with the data sources 119. For the purposes of this disclosure, the term "electronic communication" may be defined to include both wired and wireless communications. The processor is also in electronic communication with a display 110, and the processor 105 may process the data from data sources 119 into images for display on the display 110. The processor 105 may include a central processor (CPU) according to an embodiment. According to other embodiments, the processor 105 may include other electronic components capable of carrying out processing functions, such as a digital signal processor, a field-programmable gate array (FPGA), or a graphics board. According to other embodiments, the processor 105 may include multiple electronic components capable of carrying out processing functions. For example, the processor 105 may include two or more electronic components selected from a list of electronic components including: a central processor, a digital signal processor, a field-programmable gate array, and a graphic board. According to another embodiment, the processor 105 may also include a complex demodulator (not shown) that demodulates RF data from data sources 119 and generates raw data. In another embodiment the demodulation can be carried out earlier in the processing chain.

The processor 105 is adapted to perform one or more processing operations according to a plurality of selectable modalities on data from data sources 119. The data may be processed in real-time during a medical procedure as the data is received from data sources 119. For the purposes of this disclosure, the term "real-time" is defined to include a procedure that is performed without any intentional delay. The data may be stored temporarily in a buffer (not shown) during a medical procedure or other patient monitoring session and processed in less than real-time in a live or off-line operation. Some embodiments of the invention may include multiple processors (not shown) to handle the processing tasks that are handled by processor 105 according to the exemplary embodiment described hereinabove. For example, a first processor may be utilized to demodulate and decimate an RF signal while a second processor may be used to further process the data prior to displaying an image. It should be appreciated that other embodiments may use a different arrangement of processors.

Display controller 101 may further include a storage machine, such as memory 107, configured to hold instructions executable by processor 105 to implement the methods and processes described herein. When such methods and processes are implemented, the state of memory 107 may be transformed—for example, to hold different data. The memory 107 may comprise any known data storage medium. Memory 107 may include removable and/or built-in devices. Memory 107 may include optical memory (for example, CD, DVD, HD-DVD, Blu-Ray Disc, etc.), semiconductor memory (for example, RAM, EPROM, EEPROM, etc.), and/or magnetic memory (for example, hard-disk drive, floppy-disk drive, tape drive, MRAM, etc.), among others. Memory 107 may include volatile, nonvolatile, dynamic, static, read/write, read-only, random-access, sequential-access, location-addressable, file-addressable, and/or content-addressable devices.

Patient monitoring system 100 may include data sources 119 comprising a plurality of dissimilar source systems. For example, data sources 119 may include an ultrasound system 130, an echocardiograph (ECG) system 132, other physiological parameter monitoring systems 134, a recording system 120 (e.g., a recorder), an x-ray device (not shown), environmental sensors (not shown), and one or more third-party devices 138. One or more of the data sources 119 may be connected to controller 101 via a universal interface 141. Data sources 119 may further include a plurality of sensors to monitor quantities such as pressure, temperature, and so on. Data sources 119 may further include monitoring devices not shown such as an endoscope, a pulse oximeter, a noninvasive blood pressure amplifier, gas analysis systems, and the like. In general, data sources 119 may include any medical device that outputs a data signal (e.g., including patient monitoring data) in any form.

Each data source 119 may be connected to controller 101 via a specified interface. For example, each data source 119 may be connected to controller 101 via a universal serial bus (USB), FireWire, Ethernet, high-definition multimedia interface (HDMI), digital visual interface (DVI), serial digital interface (SDI), DisplayPort, video graphics array (VGA), composite interface, S-video, component, or any wired or wireless data interface for transferring patient monitoring data. In some examples, data sources 119 may include one or more third-party devices 138 that may be incapable of directly interfacing with controller 101. In such examples, a universal interface 141 may enable electronic communication between a third-party device 138 and controller 101.

As discussed herein, some data sources 119 may provide video signals, such as ultrasound system 130 or an endoscope. However, some data sources 119 may provide other forms of real-time data signals other than video. For example, a signal from a pressure sensor may not comprise a video signal, however the pressure signal may be displayed in graph form as a function of time, as an instantaneous pressure value, a combination thereof, and so on.

Patient monitoring system 100 may include a recording system 120 for recording procedure data in an event log. Recording system 120 may monitor data from sensors and detect events during a procedure. For example, recording system 120 may be directly or indirectly connected (via the controller 101, for example) to one or more data sources 119, such as a mapping system, an x-ray device, a stimulator, and/or a plurality of sensors. In this way, for example, while monitoring the electrical activity of a patient's heart, the ECG system 132 may send data to the recording device 120. In some examples, a user of recording system 120 may manually enter information in an event log.

Patient monitoring system 100 may include a display 110 comprising one or more display screens for displaying a variety of aggregated data from data sources 119. For example, display 110 may include a large display screen located in, for example, an operating room or medical laboratory. Display 110 may comprise a liquid-crystal display (LCD), a light-emitting diode (LED) display, an organic light-emitting diode (OLED) display, an electroluminescent display (ELD), a plasma display, a cathode ray tube (CRT) display, and so on. Furthermore, display 110 may include one or more display monitors for displaying a graphical user interface. Such display monitors may be used when, for example, controlling controller 101.

Controller 101 may capture and/or transform the data from each data source 119 into a transmittable data element. For example, controller 101 may encapsulate data from each data source 119 into one or more packets to form a packet stream of patient monitoring data. In this way, a portion of the patient monitoring data may be included in a payload of a packet generated by controller 101. Controller 101 includes a communication interface 142 for transmitting and/or receiving data (e.g., via a network 144), such as the encapsulated patient monitoring data described above. In some embodiments, controller 101 and/or communication interface 142 of the controller may perform additional or alternative processing on the data, such as encoding, encryption, compression, etc., in order to configure the patient monitoring data for transmission over the network. As described in more detail below with respect to FIG. 2, communication interface 142 may include a wireless hardware device and a virtualized hardware device for providing virtual interfaces that each connect to a network (e.g., network 144) via a different access point. The wireless hardware device and virtual interfaces may enable data and a redundant data copy to be nearly simultaneously transmitted from the controller 101 to a remote computing device 146 along separate paths via network 144 (e.g., an 802.11 network).

Remote computing device 146 may include any suitable computing device for receiving, aggregating, analyzing, and/or presenting patient monitoring data. For example, remote computing device 146 may allow a physician to remotely monitor a patient's status. In the illustrated example, patient monitoring data is received and/or processed for display in a graphical user interface 148 of the remote computing device 146. The information displayed in the graphical user interface 148 may include all or a subset of the information received by the controller 101 in some embodiments. For example, displayed information may include text, graphics, and/or video/animations, such as patient information, a graph of an ECG signal, a video and/or image captured by ultrasound system 130, and/or any other real-time, near real-time, and/or historical patient monitoring data.

Some or all of the data transmitted from controller 101, such as ECG data, physiological parameter monitoring data, etc., may have particularly high reliability and latency concerns. For example, losing packets of data representing electrical heart activity may lead to a false diagnosis of heart issues or may mask small cardiac events. However, a dependence on a single wireless link and a reliance on re-sending of packets to ensure data integrity may increase latency, resulting in a delayed presentation of the ECG data. As described herein, the relatively small size of such patient monitoring data (e.g., ECG data may be transmitted at 10-100 kilobits/second while maintaining near real-time presentation of the sensed data) enables the resources of a single wireless hardware device to be split into two wireless virtual interfaces to allow near simultaneous transmission of redundant data across two channels. Accordingly, FIG. 2 shows an example communication transmitting system including wireless virtual interfaces.

FIG. 2 is a schematic diagram of a communication system 200 for transmitting data (e.g., patient monitoring data) to a network 202. One or more elements of communication system 200 may be utilized in the patient monitoring system 100 of FIG. 1 in some embodiments. Communication system 200 includes a computing device 204 for receiving application data from a data source (e.g., the patient monitoring systems described in FIG. 1, storage devices, etc.), generating a transmission stream(s), and transmitting the transmission stream(s) to network 202. In some embodiments, computing device 204 may include and/or be included in controller 101 and/or remote computing device 146 of FIG. 1.

Computing device 204 includes a transmission stream configuration module 206. The transmission stream configuration module 206 receives a singular packet stream 208 of stream of application data (e.g. patient monitoring data originating from data sources 119 of FIG. 1). The transmission stream configuration module 206 may process the application data packets in order to strategically divide or copy the single input data stream onto separate streams, with each stream targeted to a different network link 218a and 218b, with intention of being received by a remote device on network 202 having a similar process in place that can receive data from the separate stream sources and reconstruct the original application data stream as prior to its division or duplication. Reconstruction of packets on a receiving device is described in later detail with respect to FIG. 3. In an embodiment, the transmission stream configuration module 206 may be part of application software (e.g., executable instructions stored on a storage device of the computing device) that is aware of (e.g., includes executable instructions for identifying and/or performing actions responsive to) the separate network interfaces and directly addresses output packet data to the separate network interfaces. In another embodiment, the transmission stream configuration may be a lower layer process that abstracts the separate interfaces, appearing to a higher level application as a standard single network interface. For the abstraction case, the application may send a single packet stream to a local (loopback) network connection, the stream then being received by the transmission stream configuration module which then constructs and sends the separate streams onto respective virtual interfaces (VIFs). In the abstracted interface case, one or both of the VIFs may need initial setup of network addressing to utilize the underlying network connections. This setup may be pre-configuration that establishes destination addresses for each of the VIF interfaces, and may be a port forwarding or NAT (network address translation) type convention. Each VIF may be assigned separate (e.g., different) media access control (MAC) addresses and non-overlapping internet protocol (IP) address subnets in order to appear to an 802.11 network as two separate hardware devices, and so that packets can be sent to the desired destination VIF by general network addressing and internal routing functions typically provided by a system operating system. Since each virtual device has an individual network state and identity, each VIF may simultaneously access the 802.11 network 202 in accordance with the associated standard protocol.

Returning to FIG. 2, incoming packets from the application data stream 208 are individually provided to VIF 210a and/or VIF 210b by the transmission stream selector 212. Transmission stream selector 212 may gate and/or otherwise control transmission of the packet stream to VIF 210a and/or 201b based on parameters such as channel metrics for the channels associated to VIFs 210a and 201b, data parameters associated with the packet stream (e.g., the data source, the type/amount of data, QoS priority tagging, etc.). In this way, the transmission stream selector 212 may select to steer a packet to a particular selected virtual interface (e.g., steering the packet to only one selected VIF and not steering the packet to any other VIF), or may govern redundant transmission via both virtual interfaces. The selective transmission of packets is described in more detail below with respect to FIGS. 5 and 7. In order to facilitate reconstruction at a receiving device, a sequence identifier may be included in each packet. In some embodiments, usable sequence numbers may be already included in the application data. In a more generalized embodiment, sequence numbers may be added by an encapsulation of each packet which later can be used and stripped from the packets at the receiving device. When the transmission stream selector sends packets on both interfaces, it may keep the same sequence on both packets (illustrated by 209a and 209b) so that a receiving device can identify and discard any packets that are redundantly received.

VIF 210a and VIF 210b are virtualized network interfaces that appear to software as if they are independent network devices, but in actuality, utilize the same wireless hardware device 214a (the physical wireless transmitting and/or receiving network device included in the computing device). In an example embodiment, the network interfaces 210a and 210b may provide a standard software interface that is used to access underlying operations of WLAN driver 216a. In order to serve the virtualized network interfaces with one device, the WLAN driver may time-share wireless operations on hardware device 214a, allocating a portion of time for performing network operations on one network interface, and allocating another portion of time for network operations on the second interface, in an interleaving fashion. The WLAN driver may store a separate set of software and network state variables in memory forming a context for each interface to maintain separate network connections and independent network addressing identities. When performing a context switch between the virtual interfaces, the WLAN driver may interchange the state variable set, and re-configure the wireless hardware device accordingly for any changes needed for the associated switched state. If the wireless hardware and software is capable of switching states quickly relative to normal network delays, and application data load is low relative to the data bandwidth of the wireless device and channel capability, the virtual interfaces will be able to service the separate application data streams 209a and 209b in a relatively simultaneous fashion. For illustration purposes, wireless hardware device 214a and wireless local area network (WLAN) driver 216a are illustrated as supporting VIF 210a, and virtualized driver 214b and virtualized hardware device 216b depicted as supporting VIF 210b, but in actuality, both are time-sharing slices of the same underlying wireless device and are the same driver software, but operating in the alternate context states.

For reliability advantages, the network connection on channels 218a and 218b may be diverse (e.g., having independent factors impacting the wireless link), providing alternate paths on which a packet (or redundant packet) may be sent, for example, each channel may comprise a different frequency or range of frequencies. The channels may additionally or alternatively include different intermediate network devices (e.g., connecting to a network via different access points) and/or otherwise provide different paths to the network. For example, wireless hardware device 214a and VIF 210a are connected to network 202 via AP1 and associated communication channel 218a in FIG. 2. Likewise, virtualized hardware device 214b and VIF 210b are connected to network 202 via AP2 and associated communication channel 218b. In addition to the data transmission on each channel, the virtual interface WLAN drivers 216a and 216b may each gather performance metrics on their respective operating channels, and supply the channel data to transmission stream selector 212. In some examples, channels 218a and 218b may have different parameters (e.g., bandwidth, signal-to-noise ratio, latency, jitter, etc.). In other examples, one or more of the parameters of channel 218a may be substantially similar to associated parameters of channel 218b. The virtualization of the interfaces allows each to operate independently in accordance with the 802.11 protocol. In some embodiments, however, WLAN driver/device may share selected control operations commonly among the virtual interfaces without being logically or operationally isolated. For instance, the multi-channel roaming arbiter of this disclosure (discussed below in respect to FIG. 4) is an example of an embodiment that may use a single scan of channels to find candidate roam APs in conjunction for both interfaces, rather than a scan channels on one interface, and then re-scan the same channels for separate use on the other interface.

FIG. 3 is a schematic diagram of a communication system 300 for receiving data (e.g., patient monitoring data) from a network 202. One or more elements of communication system 300 may be utilized in the patient monitoring system 100 of FIG. 1 in some embodiments. Communication system 300 includes a computing device 304 for receiving application data from a network, reconstructing a received packet stream(s), and providing the received stream(s) to an application data module 306. In some embodiments, computing device 304 may include and/or be included in controller 101 and/or remote computing device 146 of FIG. 1. In some embodiments, the elements in FIG. 3 having the same name as associated elements in FIG. 2 may be the same associated elements as described above with respect to FIG. 2, but depicted operating in a receiving mode. Due to time-slicing of operations, the WLAN driver may utilize special provisioning to receive packets on separate channels. Since the hardware device may only be able to actually operate on one channel at a time, an incoming packet on one channel could be missed if the driver were operating on the alternate channel during the incoming transmission. In an embodiment, general operations in the 802.11 protocol related to power saving may be utilized to coordinate receive operations. Polling power save modes use messaging to communicate to an access point that a wireless device will be sleeping (in a power-save state), indicating that data should not be sent from the access point until the device sends another message notifying that it is awake and ready to receive. In an embodiment of the disclosure, the WLAN driver may repurpose power-save messages to notify an access point to sleep (hold all messages) on one channel, while actively operating on a the alternate channel, and vice-versa, interleaving the sleep/awake periods for each channel. Incoming receive messages may be delayed during operations on the other channel. However, for application such as patient monitoring, the trade-off may be reasonable, since real-time latency need may be greater in a particular network direction, such as sending real-time patient data in an uplink to a viewing device, whereas downlink messages may be used for configuration and control with less than real-time requirements.

As illustrated, data (e.g., a packet stream of patient monitoring data) is received from network 202 via one or more of access points 1 and 2. For example, the data received from network 202 may include the data transmitted from a computing device 204 of FIG. 2 on a remote system. It is to be understood that while computing device 304 is illustrated as receiving data from AP1 and AP2 (also illustrated in FIG. 2), the data may be alternatively be received from one or more different access points than the access points utilized by the associated transmitting computing device. For example, computing device 204 of FIG. 2 may transmit main data via a first access point and redundant data via a second access point, and computing device 304 may receive one or more of the transmitted main data and the redundant data via a third access point and a fourth access point (the first, second, third, and/or fourth access points being different from one another). Similarly to computing device 204 of FIG. 2, receiving computing device 304 includes a wireless hardware device 314a (e.g., a physical wireless network device) and a virtualized hardware device 314b, each associated with a respective WLAN driver 316a or 316b and wireless virtual interface (VIF) 310a or 310b. Wireless hardware device 314a and associated VIF 310a communicate with AP1 via channel 318a, while virtualized hardware device 314b and associated VIF 310b communicate with AP2 via channel 318b. In some embodiments, a remote device (such as device 146 of FIG. 1) may operate on a wired network, using wired virtual interfaces in place of the wireless interfaces as described, and relying on network virtualization VLAN setup to route separate traffic streams for the WLAN infrastructure to separate VLANs on the wired network.

Receiving computing device 304 includes a packet stream reconstruction module 320, which receives packets (e.g., packets S1-S3) from the network 202 via VIF 310a and VIF 310b. For example, as illustrated, packets S1, S2, and S3 may be provided to the packet stream reconstruction module by VIF 310a, while VIF 310b may provide packets S1 and S2. As packets S1 and S2 are received by both VIFs, these packets may be designated as redundant packets. For example, each VIF of the transmitting device (e.g., computing device 204 of FIG. 2) may have transmitted packets S1 and S2 redundantly in order to increase data integrity/reliability. Packet stream reconstruction module 320 may reconstruct the transmitted/original packet stream from the received packet stream by selectively discarding redundant packets. In some embodiments, packets may be selectively discarded based on an analysis of the received packets and/or by other parameters. The selective discarding of packets is described in further detail below with respect to FIG. 6.

In the illustrated embodiment, the S1 packet received from VIF 310a and the S2 packet received from VIF 310b are discarded, as indicated by dashed arrows. Accordingly, when reconstructing the packet stream, the location in the stream associated with packet S1 is filled with the data from the packet S1 received by VIF 310b. In some embodiments, the packet stream is reconstructed with little or no buffering of the received packets. For example, upon receipt of a packet, the packet stream reconstruction module 320 may check if a packet having the same identifier (e.g., sequence number) has already been received (e.g., via the other VIF). If another packet having the same identifier has not been received and/or upon receipt of a next packet in the stream (e.g., a packet having a next sequence number), the packet stream reconstruction module may insert that packet into a location within the reconstructed stream associated with the identifier and/or transmit the packet to the application data module 306. In additional or alternative embodiments, the packet stream reconstruction module 320 may include cache storage and/or a buffer for temporarily storing a selected number of packets prior to reconstructing the packet stream and sending the reconstructed packet stream to application data module 306. For example, all of the packets in the buffer may be transmitted once the buffer is full and/or the buffer may be a first in, first out (FIFO) buffer in which only a first packet in the buffer is transmitted once the buffer is full and a next packet is received. Configurations utilizing no buffer or minimal buffering may provide decreased latency, while configurations utilizing more buffering may provide more evenly-distributed data transmissions.

The reconstructed packet stream is provided to application data module 306. In some embodiments, application data module 306 may be local to computing device 304 (e.g., included within the computing device), as indicated by the dashed lines extending the boundaries of computing device 304. In such embodiments, the application data module may include a data module utilized by a user interface of the computing device and/or other application of the computing device. For example, the application data module may include a user interface module for presenting patient monitoring data to a user of the computing device 304. In additional or alternative embodiments, the application data module may be remote from the computing device 304. For example, the application data module may be included in another computing device that is in communication with and/or controlled by computing device 304.

FIG. 4 shows a schematic diagram of an example communication system 400 for roaming between access points of a network. One or more elements of communication system 400 may be utilized in the patient monitoring system 100 of FIG. 1 in some embodiments. Communication system 400 includes a computing device 404 for transmitting and/or receiving application data from a network. In some embodiments, computing device 404 may include and/or be included in controller 101 and/or remote computing device 146 of FIG. 1.

As illustrated, data (e.g., a packet stream of patient monitoring data) is received from and/or transmitted to network 202 via one or more of access points 1 and 2. For example, computing device 404 may correspond to computing device 204 of FIG. 2, computing device 304 of FIG. 3, and/or a combination thereof to provide a computing device that may transmit and/or receive data via network 202. Similarly to transmitting computing device 204 of FIG. 2 and receiving computing device 304, roaming computing device 404 includes a wireless hardware device 414a (e.g., a physical wireless network device) and a virtualized hardware device 414b, each associated with a respective WLAN driver 416a or 416b and wireless virtual interface (VIF) 410a or 410b. Wireless hardware device 414a and associated VIF 410a communicate with AP1 via channel 418a, while virtualized hardware device 414b and associated VIF 410b communicate with AP2 via channel 418b. It is to be understood that elements in FIG. 4 having the same name as associated elements in FIGS. 2 and/or 3 may be configured similarly to such associated elements and as described above with respect to FIGS. 2 and/or 3.

Computing device 404 includes a multi-channel roaming arbiter 420 configured to coordinate roaming decisions to seek different access points for connecting to via each VIF. For example, the roaming arbiter 420 may collect channel metrics from WLAN drivers 416a and 416b regarding channels 418a and 418b, respectively. Roaming arbiter 420 may also determine that new access points are within range of computing device 404 based on scans performed by wireless hardware device 414a. For example, wireless hardware device 414a may detect roam candidate A and roam candidate B as possible access points to which the computing device may be connected. Roaming arbiter 420 may analyze channel metrics for currently-used channels 418a and 418b (e.g., signal strength, bandwidth, number of retransmissions performed) and compare these metrics to channel metrics associated with roam candidates A and B. Responsive to determining that one or more of the roam candidates may provide a more reliable, stable, and/or faster communication channel, the roaming arbiter 420 may initiate a handover routine to switch from one or more of AP1 and AP2 to one or more of roam candidate A and roam candidate B. A handover routine enables a VIF to disconnect from one (currently-used) access point and connect to another (new) access point. For example, roaming arbiter 420 may instruct the communication modules (e.g., VIFs, hardware devices, etc.) to perform a soft-handover (make-before-break) connection to allow payload data to continue on one channel (e.g., using one of the VIFs) while a new connection is being made to a new access point (e.g., using the other of the VIFs). By continuing to send data on one channel with a first VIF while changing an access point to which a second VIF is connected, delays associated with the handshake/handover processes of access point transference may be mitigated. In this way, a client may freely switch between access points based on current conditions of the access point and associated channel.

FIG. 5 is a flow chart of a method 500 for selectively transmitting redundant data via wireless virtual interfaces. The method of FIG. 5 may be performed by any suitable computing device, such as transmitting computing device 204 of FIG. 2. Method 500 includes initializing multiple wireless virtual interfaces (VIFs) from a single physical network device by assigning separate MAC addresses and non-overlapping IP addresses to each VIF, as indicated at 502. At 504, method 500 includes associating each VIF with a different wireless access point (AP) to connect each VIF to a network associated with that access point. At 506, method 500 includes transmitting data from a first VIF to the network via a first AP. For example, patient monitoring data received at a transmitting computing device may be packetized and transmitted on a first channel using the first VIF, the first channel being a wireless communication channel connecting the first VIF to a first AP (and to an 802.11 network).

At 508, method 500 includes transmitting a selected amount of redundant data from a second VIF (e.g., a different VIF than the VIF used at 506) to the network via a second AP (e.g., a different AP than the AP used at 506). The amount of redundant data may be selected based on channel/data metrics, as indicated at 510. Data metrics may include a type of data, size of data, and/or other data information indicative or predictive of quality of service (QoS) parameters of the wireless link (e.g., minimum/maximum latency, bitrate, error rate, jitter, etc.). For example, if the signal strength from one (or both) available APs is determined to be above a quality threshold indicating a high probability of a successful transmission, the data may be selected to be sent to only one of the APs (e.g., the AP with the strongest signal). In another case, if it is determined that no APs have signal strength above the quality threshold, the data may be then be sent to both APs (for redundancy). As indicated at 512, the amount of redundant data may additionally or alternatively be selected based on a user setting. For example, the quality threshold may be adjustable such that raising or lowering the quality level would change the decision point of when to use one or two APs for transmission. An adjustment of this type may be useful to a user (e.g. network administrator) who is concerned about total traffic on a network. Although traffic for a single device would be deterministic at a period in time, an adjustable threshold level would influence the average traffic over time and/or in consideration of total traffic from multiple devices that may be randomly spaced about the coverage area. In this way, a user may balance particular bandwidth or quality of service needs, increasing the amount of redundant transmissions for an application with high need for quality of service, or lowering redundant transmission to reduce the data bandwidth consumed when a lower level of QoS is acceptable.

At 514, the method 500 includes determining if the computing device is roaming. For example, if the transmitting computing device includes and/or receives sensor data from a sensor device (e.g., outputting data signals indicating one or more physiological parameters) that is proximate to a patient, the computing device may be mobile and capable of moving (e.g., with a patient) relative to one or more access points. Accordingly, the computing device may be determined to be roaming if a connection to a currently-used access point degrades below a threshold amount, the computing device moves outside of a threshold range of a currently-used access point, and/or if additional access points are identified as being within range of the computing device. If the computing device is not determined to be roaming (e.g., "NO" at 514), the method returns to 506 to continue transmitting data via the currently-used access points.

Conversely, if the computing device is determined to be roaming (e.g., "YES" at 514), the method proceeds to 516 to locate and selectively associate one or more of the VIFs with a new access point. For example, as described above with respect to FIG. 4, new access points may be located by a wireless hardware device and selected for use if the new access point provides some increase in communication parameters (e.g., higher throughput rate, increased reliability/signal strength, etc.). As indicated at 518, the VIF(s) may be used in conjunction to form a soft-handover by associating to a new AP on one VIF (e.g., one with the current weakest signal), while maintaining the AP association (if possible) on the other VIF, reducing downtime by allowing application data to be sent on at least one connection (albeit interleaved with protocol management handshaking on the other) during the roaming transition. At 520, method 500 includes transmitting data from the VIF(s) to the network via the new AP(s).

FIG. 6 is a flow chart of an example method 600 for receiving data via wireless virtual interfaces. For example, method 600 may be performed by receiving computing device 304 of FIG. 3. At 602, method 600 includes receiving data (e.g., a packet stream of patient monitoring data) from each VIF of the computing device. At 604, method 600 includes verifying the integrity of the received data. For example, the integrity of the received data may be verified by performing a cyclic redundancy check (CRC) on the received data, as indicated at 606. It is to be understood that any suitable data integrity check may be performed, including analyzing parity bits, checksums, hash functions, etc.

At 608, method 600 includes selectively discarding redundant packets. For example, for a set of redundant packets (e.g., packets having a same identifier/sequence number), the packet(s) that have a lower data integrity than other packets in the set (e.g., based on the verification performed at 604 and/or 606) may be discarded, as indicated at 610. If redundant packets are received that have a same level of data integrity (e.g., if all redundant packets were received with no data loss), the discarded packet(s) may be selected randomly/arbitrarily, based on a time of receipt (e.g., a first received, last received, etc.) of the packet, based on a VIF/channel from which the packet was received (e.g., always discarding from a selected VIF), and/or based on any other suitable criteria. At 612, method 600 includes rebuilding the packet stream. For example, as indicated at 614, the packet stream may be rebuilt based on the sequence numbers or other identifiers in each packet identifying the location of that packet in the stream relative to other packets.

FIG. 7 is a flow chart of an example method 700 for evaluating network parameters, adjusting redundant data transmission, and roaming between access points of a network. For example, method 700 may be performed by any of transmitting computing device 204, receiving computing device 304, and/or roaming computing device 404 of FIGS. 2, 3, and 4, respectively. At 702, method 700 includes determining channel/network parameters. For example, signal strength for a communication signal between each VIF and associated AP, a number of retransmissions requested and/or performed on each channel, a comparison of a range of each AP and a current location of the computing device, historical data relating to data integrity of prior transmissions, bandwidth, and/or other channel/network parameters may be evaluated at 702.

At 704, method 700 includes determining if the computing device is within a threshold range of an access point to which the computing device is currently connected. If the computing device is not within range of the AP (e.g., "NO" at 704), the method proceeds to 706 to increase the amount of redundant packets being transmitted. Conversely, if the computing device is within range of the AP (e.g., "YES" at 704), the method proceeds instead to 708 to decrease the amount of redundant packets being transmitted. It is to be understood that in some embodiments, instead of increasing or decreasing the amount of redundant packets being transmitted, the amount of redundant packets (e.g., on a second channel, the main packets being transmitted on a first channel) being transmitted may be selected from a range of possible values (e.g., no packets are redundantly transmitted, each packet is redundantly transmitted once, every other packet is redundantly transmitted once, every other packet is redundantly transmitted twice, only a selected subset of the data transmitted on a first channel is transmitted on a second channel, etc.) based on whether the computing device is within the threshold range of the AP (e.g., within a threshold distance of a central point of the AP's coverage range). In additional or alternative embodiments, the amount of redundant packets may be selected or calculated as a function of the location of the computing device relative to the coverage range of the AP. For example, for every 50 feet outside of a central point of the coverage range of the AP, the amount of redundantly transmitted packets may increase by a certain factor (e.g., one additional redundant packet may be transmitted per three packets).

At 710, method 700 includes determining if roam candidates (e.g., access points that may be used) are located. The location of roam candidates may indicate that the computing device is at an edge of a coverage area of a currently-used AP. If roam candidates are not located (e.g., "NO" at 710), the method may return to continue monitoring channel/network parameters at 702. Conversely, if roam candidates are located (e.g., "YES" at 710), the method proceeds to 712 to compare channel information/conditions/metrics of the roam candidates to channel information/conditions/metrics of a currently-used AP(s). At 714, the method 700 includes selecting one or more AP(s) for connection to the VIF(s) of the computing device. For example, the AP(s) may be selected to provide the most robust connection to the network based on the channel information/conditions/metrics. At 716, the method includes determining if the selected AP(s) include one or more of the roam candidates. If the selected AP(s) do not include one or more of the roam candidates (e.g., "NO" at 716), then the currently-used AP(s) were identified as the most robust or otherwise best access points at that time, and no handover is to be performed to transition the VIF(s) to other AP(s). Accordingly, the method returns to continue monitoring channel/network parameters at 702. Conversely, if the selected AP(s) include one or more of the roam candidates (e.g., "YES" at 716), the method proceeds to 718 to perform a handover routine in order to associate the selected roam candidate(s) to the VIF(s). For example, if only one of the selected AP(s) included a roam candidate, then transmission may continue on the other selected AP (e.g., the selected AP that is also being currently used) via an associated VIF while the other VIF is switched to the new AP (the selected roam candidate). If both of the selected Aps included a roam candidate, then transmission may continue on a first currently-used AP via an associated first VIF while the second VIF is switched to one of the new APs (one of the selected roam candidates), then transmission may be performed on the newly-switched AP via the second VIF while the first VIF is switched to the other of the new APs.

The technical effect of the disclosure may include a connection of a single physical wireless network device to one or more access points of an IEEE 802.11 wireless network via multiple communication channels. Another technical effect of the disclosure may include the selective transmission of redundant data on two channels with a single physical wireless network device to an IEEE 802.11 wireless network.

An embodiment relates to a method of transmitting data with a wireless hardware device. The method includes initializing a first wireless virtual interface and a second wireless virtual interface, each wireless virtual interface communicating with a network using resources of the wireless hardware device, and transmitting data from the first wireless virtual interface to the network via a first channel to a first access point of the network. The method further includes transmitting a selected amount of redundant data from the second wireless virtual interface to the network via a second channel to a second access point of the network, the selected amount being based on channel metrics of one or more of the first channel and the second channel. In one example, only a selected subset of the data transmitted via the first channel (e.g., every other packet, every third packet, etc.) may be redundantly transmitted via the second channel. In a first example, the network over which data is transmitted in the method is an IEEE 802.11 network. In an example, the channel metrics include one or more of a bandwidth, a number of retransmissions performed over a period of time, and a signal strength of one or more of the first channel and the second channel. In an additional or alternative example, the selected amount of redundant data is based on a user setting. In an additional or alternative example, the selected amount of redundant data is based on one or more of a type of data being transmitted and a QoS parameter for data being transmitted.

The method may further include determining if the wireless hardware device is roaming by scanning for additional access points for the network and comparing channel metrics of one or more located additional access points to channel metrics associated with the first access point and the second access point. A handover routine may be performed to connect one or more of the first and second wireless virtual interfaces to one or more of the located additional access points based on the comparison of the channel metrics. The handover routine may be a soft handover routine.

In an example, data may be transmitted from a first wireless virtual interface to the network comprises receiving patient monitoring data from one or more patient monitoring sensors and encapsulating the patient monitoring data into packets of a transmission stream, the patient monitoring sensors configured to output data signals indicating one or more physiological parameters of a patient. In additional or alternative examples, the channel metrics may include a coverage range of the first access point relative to a location of the wireless network device, and a method may include increasing the selected amount of redundant packets being transmitted responsive to determining that the location of the wireless network device is greater than a threshold distance from a central point of the coverage range of the first access point. The selected amount of redundant packets being transmitted may be decreased responsive to determining that the location of the wireless network device is less than a threshold distance from a central point of the coverage range of the first access point.

In an example, the channel metrics include a coverage range of the first access point relative to a location of the wireless network device, wherein the selected amount of redundant packets being transmitted is zero responsive to determining that the location of the wireless network device is less than a threshold distance from a central point of the coverage range of the first access point. Data on the first channel and the second channel may be transmitted using time-division multiplexing.

Another embodiment relates to a system. The system may include a wireless hardware device providing hardware resources for a first wireless virtual interface to connect to a first access point of a network and a second wireless virtual interface to connect to a second access point of the network. The system may further include a transmission stream selector including instructions to transmit data from the first wireless virtual interface to the network via a first channel to the first access point of the network and selectively transmit redundant data from the second wireless virtual interface to the network via a second channel to the second access point of the network based on channel metrics of one or more of the first channel and the second channel.

In an example, the network is an IEEE 802.11 network and the first channel may be distinct in its entirety from the second channel. The channel metrics may include one or more of a bandwidth, a number of retransmissions performed over a period of time, and a signal strength of one or more of the first channel and the second channel, the channel metrics being provided by a driver for the wireless hardware device to the transmission stream selector. The wireless hardware device and the transmission stream selector may be included in a computing device of a patient monitoring system, and the transmission stream selector may be configured to selectively transmit patient monitoring data via one or more of the first channel and the second channel.

Another embodiment relates to a method of communicating medical data in a wireless communication network. The method includes receiving, at a computing device, medical data from one or more patient monitoring sensors, the computing device including a wireless hardware device, and transmitting a packet stream from a first wireless virtual interface to the network via a first channel to a first access point of the network, the first wireless virtual interface transmitting the packet stream using hardware resources of the wireless hardware device. The method further includes redundantly transmitting a selected number of redundant packets from the packet stream from a second wireless virtual interface to the network via a second channel to a second access point of the network, the selected number of packets being selected based on one or more of channel and data metrics associated with one or more of the medical data, the first channel, and the second channel, and the second wireless virtual interface redundantly transmitting the selected number of packets from the packet stream using hardware resources of the wireless hardware device.

In an example, the computing device is a first computing device, the method further including receiving, at a second computing device remote from the first computing device, the packet stream and the redundant packets, determining an integrity of the received packet stream and the redundant packets, and selectively discarding the redundant packets or packets from the packet stream corresponding to the redundant packets based on the integrity of the redundant packets and the packets from the packet stream corresponding to the redundant packets. The selected amount of redundant data may be based on one or more of a type of the medical data being transmitted and a QoS parameter for the medical data being transmitted.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The invention claimed is:

1. A method of transmitting data with a wireless hardware device of a computing device in a medical environment, the method comprising:
   initializing a first wireless virtual interface and a second wireless virtual interface, each at the computing device, each wireless virtual interface communicating with a wireless local area network of the medical environment using resources of the wireless hardware device;
   receiving, at the computing device, patient monitoring medical data from one or more patient monitoring devices of the medical environment, the patient monitoring devices configured to output data signals indicating one or more physiological parameters of a patient in the medical environment;
   encapsulating the received patient monitoring medical data into one or more packets to form a data stream;
   transmitting the data stream from the first wireless virtual interface at the computing device to a first access point of the wireless local area network via a first channel; and
   transmitting a selected amount of redundant data of the data stream from the second wireless virtual interface at the computing device to a second access point of the wireless local area network via a second channel, the selected amount being based on channel metrics of one or more of the first channel and the second channel and further based on a quality of service need of the data stream, including selectively transmitting packets redundantly in response to a signal strength of both the first and second channels being below a quality threshold, and the redundant data being transmitted via the second channel from the computing device nearly simultaneously to the data stream being transmitted via the first channel from the computing device, wherein the quality threshold is adjustable based on a type of patient monitoring medical data being transmitted.

2. The method of claim 1, wherein the data stream is transmitted at 10-100 kilobits/second, wherein the wireless local area network is an IEEE 802.11 network, and wherein transmitting the selected amount of redundant data based on the quality of service need of the data stream comprises increasing the selected amount of redundant data as the quality of service need of the data stream increases.

3. The method of claim 2, wherein the channel metrics include one or more of a bandwidth, a number of retransmissions performed over a period of time, and the signal strength of one or more of the first channel and the second channel, and wherein initiating the first wireless virtual interface and the second wireless virtual interface comprises assigning separate media access control addresses and non-overlapping internet protocol addresses to the first wireless virtual interface and the second wireless virtual interface.

4. The method of claim 2, wherein the selected amount of redundant data is based on a user setting, wherein the selected amount of redundant data includes a subset of the data stream transmitted via the first channel, and wherein initiating the first wireless virtual interface and the second wireless virtual interface comprises associating the first wireless virtual interface with the first access point and associating the second wireless virtual interface with the second access point to connect each wireless virtual interface to the wireless local area network.

5. The method of claim 2, further comprising determining if the wireless hardware device is roaming by scanning for additional access points for the wireless local area network and comparing channel metrics of one or more located additional access points to channel metrics associated with the first access point and the second access point.

6. The method of claim 5, further comprising performing a handover routine to connect one or more of the first and second wireless virtual interfaces to one or more of the located additional access points based on the comparison of the channel metrics.

7. The method of claim 6, wherein the handover routine is a soft handover routine.

8. The method of claim 2, wherein the quality of service need of the data stream is based on a type of data in the data stream.

9. The method of claim 2, wherein the channel metrics include a coverage range of the first access point relative to a location of the wireless hardware device, the method further comprising increasing the selected amount of redundant data being transmitted responsive to determining that the location of the wireless hardware device is greater than a threshold distance from a central point of the coverage range of the first access point.

10. The method of claim 9, further comprising decreasing the selected amount of redundant data being transmitted responsive to determining that the location of the wireless hardware device is less than the threshold distance from the central point of the coverage range of the first access point.

11. The method of claim 2, wherein the channel metrics include a coverage range of the first access point relative to a location of the wireless hardware device, wherein the selected amount of redundant data being transmitted is zero responsive to determining that the location of the wireless hardware device is less than a threshold distance from a central point of the coverage range of the first access point.

12. The method of claim 2, wherein data on the first channel and the second channel is transmitted using time-division multiplexing between the first and second channels.

13. A patient monitoring system for a medical environment, comprising:
   one or more patient monitoring devices; and
   a computing device including:
      a wireless hardware device providing hardware resources for a first wireless virtual interface to connect to a first access point of a wireless local area network and a second wireless virtual interface to connect to a second access point of the wireless local area network; and
      a transmission stream configuration module comprising instructions stored on a storage device of the computing device and executable to receive patient monitoring medical data originating from the one or more patient monitoring devices and encapsulate the patient monitoring medical data into a data stream, the transmission stream configuration module comprising a transmission stream selector including instructions to:
         transmit the data stream from the first wireless virtual interface of the computing device to the wireless local area network via a first channel to the first access point of the wireless local area network; and
         selectively transmit redundant data of the data stream from the second wireless virtual interface of the computing device to the wireless local area network via a second channel to the second access point of the wireless local area network based on channel metrics of one or more of the first channel and the second channel and further based on a quality of service need of the data stream, including selectively transmitting packets redundantly in response to a signal strength of both the first and second channels being below a quality threshold, the redundant data being transmitted via the second channel nearly simultaneously to the data stream being transmitted via the first channel, and wherein the quality threshold is adjustable based on a type of patient monitoring medical data being transmitted.

14. The system of claim 13, wherein the data stream is transmitted at 10-100 kilobits/second, wherein the wireless hardware device includes a wireless network interface/interface controller, wherein the wireless local area network is an IEEE 802.11 network, and wherein the first channel is distinct in its entirety from the second channel.

15. The system of claim 14, wherein the channel metrics include one or more of a bandwidth, a number of retransmissions performed over a period of time, and the signal strength of one or more of the first channel and the second channel, the channel metrics being provided by a driver for the wireless hardware device to the transmission stream selector.

16. The system of claim 15, wherein the driver stores a separate set of software and network state variables in memory for each wireless virtual interface, thereby forming a context for each wireless virtual interface to maintain separate network connections and independent network addressing identities, and wherein the quality of service need is based on the type of patient monitoring medical data in the data stream.

17. A method of communicating medical data in a wireless local area network of a medical environment, the method comprising:
  receiving, at a computing device, medical data from one or more patient monitoring sensors, the computing device including a wireless hardware device;
  transmitting a packet stream from a first wireless virtual interface of the computing device to the wireless local area network via a first channel to a first access point of the wireless local area network, the first wireless virtual interface transmitting the packet stream using hardware resources of the wireless hardware device of the computing device; and
  selectively transmitting packets redundantly from the packet stream from a second wireless virtual interface of the computing device to the wireless local area network via a second channel to a second access point of the wireless local area network, conditions of redundant packets being sent being based on one or more of channel and data metrics associated with one or more of the medical data, the first channel, and the second channel, including selectively transmitting packets redundantly in response to a signal strength of both the first and second channels being below a quality threshold, the second wireless virtual interface redundantly transmitting a selected number of packets from the packet stream using the hardware resources of the wireless hardware device, and the redundant packets being transmitted via the second channel simultaneously to the packet stream being transmitted via the first channel, the quality threshold adjustable based on a type of medical data being transmitted.

18. The method of claim 17, wherein the computing device is a first computing device, the method further comprising:
  receiving, at a second computing device remote from the first computing device, the packet stream and the redundant packets, each of the redundant packets having a same identifier or sequence number as an associated packet from the packet stream,
  determining an integrity of the received packet stream and the redundant packets, and
  selectively discarding the redundant packets or selected packets from the packet stream having the same identifier or sequence number as at least one of the redundant packets based on the integrity of the redundant packets and the selected packets from the packet stream.

19. The method of claim 17, wherein the quality threshold is further adjustable based on a QoS parameter for the medical data being transmitted and wherein the packet stream is transmitted at 10-100 kilobits/second.

* * * * *